3,251,417
REMOVAL OF WATER FROM BOREHOLES
Willis E. Holman and John T. Patton, Houston, Tex.,
  assignors, by mesne assignments, to Esso Production
  Research Company, Houston, Tex., a corporation of
  Delaware
No Drawing. Filed Feb. 5, 1965, Ser. No. 430,759
        16 Claims. (Cl. 166—45)

This application is a continuation-in-part of application Serial No. 289,410, filed in the United States Patent Office on June 20, 1963, and now abandoned.

The present invention relates to the removal of water from oil wells, gas wells and similar boreholes and is particularly concerned with the use of foaming agents to facilitate water removal with air or gaseous fluids.

Foaming agents are often used to remove water from boreholes during air drilling operations. Experience has shown that the generation of foam increases the rate at which water can be carried to the surface and thus facilitates the continued circulation of air or gas for the removal of cuttings. One of the problems encountered in generating foam for this purpose has been the development of suitable foaming agents. Most of the soaps, detergents, and similar materials normally employed will permit the handling of only limited quantities of water. Where water influx rates are high, it may eventually become necessary to discontinue the use of air or gas and resort to the circulation of an ordinary drilling mud. This use of mud is accompanied by a reduction in penetration rate and a loss of the advantages normally associated with air drilling. Similar difficulties are encountered in aeration drilling and in using foaming agents for the removal of water from producing gas wells.

The present invention provides a means for increasing the effectiveness of foaming agents used in air drilling and similar operations. In accordance with the invention, it has now been found that the efficiency of such operations can now be improved by utilizing the foaming agents in conjunction with high molecular weight water-soluble polymers. Tests have shown that the addition of such polymers improves foam production in the borehole and increases the rate at which the water can be removed to the surface. This permits wider use of air drilling and facilitates the application of similar techniques for the removal of water from producing gas wells and other boreholes.

A wide variety of different water-soluble polymers may be employed for purposes of the invention. The materials utilized will normally have molecular weights in the range between about 100,000 and 5,000,000 Staudinger or higher. The molecular weight range most effective in the case of a particular polymer will depend somewhat upon the polymer structure and the solubilizing groups present on the molecule. In most cases molecular weights in excess of about 1,000,000 Staudinger are preferable.

Specific examples of water-soluble polymers of high molecular weight which are suitable for purposes of the invention include homopolymers prepared from acyclic unsaturated carboxylic acids such as acrylic acid and substituted acrylic acids; copolymers of unsaturated carboxylic acids such as acrylic acid and methacrylic acid with low molecular weight olefins such as propylene and isobutylene; copolymers of unsaturated monocarboxylic acids such as acrylic acid and methacrylic acid with unsaturated dibasic acids and acid anhydrides such as fumaric acid, maleic acid and maleic anhydride; copolymers of unsaturated dibasic acids and acid anhydrides such as maleic acid and maleic anhydride with vinyl aromatic compounds such as styrene, vinyl toluene, vinyl naphthalene, p-chlorostyrene, dichlorostyrene, transstilbene, isoallylbenzene, vinyl carbazol and vinyl ferrocene; copolymers of unsaturated dibasic acids and acid anhydrides such as maleic acid and maleic anhydride with unsaturated salts, esters and ethers of mono- and dicarboxylic acids such as methyl methacrylate, ethyl acrylate, allyl propionate, ethyl fumarate, isopropyl maleate, vinyl methyl ether, vinyl acetate, vinyl chloride and acrylonitrile; copolymers of unsaturated monocarboxylic acids such as acrylic and methacrylic acids with vinyl aromatics such as styrene and vinyl toluene; sulfonated polyvinyl aromatics such as sulfonated polystyrene, sulfonate polyvinyltoluene and sulfonated copolymers of styrene and vinyl toluene; and the like. Methods for the polymerization of organic monomers to produce these and similar water soluble synthetic polymers suitable for purposes of the invention have been described at length in the chemical and patent literature and will therefore be familiar to those skilled in the art.

Also useful for purposes of the invention are water-soluble polymers derived from natural sources. These include polysaccharides such as alginic acid and sodium alginate which are found in plants and in gums and resins obtained as plant exudates, certain polysaccharides produced by the fermentation of sugars, starches and other carbohydrates by bacteria of the genus *Xanthomonas* and similar bacteria, polysaccharides produced extracellularly by the yeast *Cryptococcus laurentii*, var. *Flavescens*, NRRL-Y 1401 and related organisms, and polymers such as carboxymethyl cellulose and carboxyethyl cellulose produced by the chemical treatment of cellulose and other naturally occurring high molecular weight polymers. Still other water-soluble polymers of high molecular weight which may be employed will suggest themselves to those skilled in the art. It will be recognized that the solubility properties, stability and other characteristics of water-soluble polymers vary and that all such polymers are therefore not equally effective for purposes of the invention. In general the high molecular weight polysaccharides are particularly effective at low concentrations and are therefore preferred. The use of polysaccharides produced by bacteria of the genus *Xanthomonas*, particularly *Xanthomonas campestris*, *Xanthomonas begoniae*, *Xanthomonas phaseoli*, *Xanthomonas heterae*, *Xanthomonas incanae*, *Xanthomonas carotae*, *Xanthomonas translucens* and similar organisms, is especially effective. Methods for the production of such polysaccharides are described in greater detail in U.S. Patent 3,020,206 issued on February 6, 1962.

Polymers of the type described above can be utilized with a variety of different foaming agents for the removal of water from wells and similar boreholes. Tests have shown that anionic, cationic or nonionic surface active agents may be employed. The use of nonionic compounds is generally preferred. Suitable agents include fatty alkylol amide condensates, substituted polyamines, polyoxyethylene condensates of fatty alcohols, polyoxyethylene condensates of fatty acids, polyoxyethylene esters of long chain mixed acids, polyoxyethylene condensates of long chain amides, polyoxyethylene condensates of hydrogenated tallow, polyoxyethylene alkyl phenols, polyoxyethylated polyoxyolefins, polyoxylated polyoxyolefin amines, polyoxyethylene aliphatic ethers, polyoxyethylene aliphatic thioethers, phosphoric acid esters of polyethylene glycol, condensation products of polyhydric alcohols with water-soluble polybasic acids, alkali metal salts of alkyl aryl polyester sulfonates, alkali metal organic sulfates, alkali metal organic phosphates, fatty acid imidazolines, and the like. Other commercially available surface active agents and mixtures of surface active agents are also suitable. Further information concerning such agents may be found in "Encyclopedia of Surface Active Agents" by J. P. Sisley, translated from the French by P. J. Wood, Chemical Publishing Company, New York, 1952, and elsewhere in the chemical literature. Again it will be recognized that all of the materials referred to above are not equally effective for purposes of the invention and that better results are obtained with certain materials than with others.

The concentrations in which the high molecular weight water-soluble polymers and foaming agents are utilized in carrying out the invention will depend in part upon the particular materials selected and the conditions under which they are to be used. In air drilling and similar operations, it is generally preferred to inject the foaming agent and water-soluble polymer into the stream of air or gas circulated into the borehole in amounts sufficient to provide foaming agent concentrations of from about 0.01% to about 2.0% and water-soluble polymer concentrations of from about 0.001% to about 1.0%, both based on the active ingredients and the weight of water present in the borehole. The ratio between the concentration of the foaming agent and that of the water-soluble polymer will generally range between about 1:1 and about 10:1. Greater quantities of either the foaming agent or water-soluble polymer may be employed if desired but this is seldom necessary.

In utilizing the foaming agents and water-soluble polymers for the removal of water from producing gas wells, it is generally preferred to employ the materials in solid form. Many of the polyoxyethylated compounds and similar foaming agents are solids which can be mixed with the water-soluble polymers and molded into sticks, balls, pellets or other shapes for use in waterlogged wells and similar boreholes. Weighting agents such as barium sulfate, ferric oxide, lead oxide, lead sulfide and the like may be included if desired. A typical composition may contain from about 10 to about 40% of polyoxyethylated tridecyl alcohol or similar foaming agent, from about 10% to about 40% of the water-soluble polymer, and from about 5 to about 35% or more of barium sulfate. When a stick of such a material is dropped into the water at the bottom of a water-logged gas well, it slowly dissolves. The foaming agent and water-soluble polymer thus liberated into the water result in the formation of a foam as gas from the producing zone surrounding the borehole bubbles into the water. This permits more effective removal of the water than can normally be obtained in the absence of the polymer.

The nature and objects of the invention are further illustrated by the following examples.

EXAMPLE I

In a first series of experiments, a polyoxyethylated tridecyl alcohol marketed for use as a foaming agent in air drilling operations was tested to determine its effectiveness in the presence of various high molecular weight water-soluble polymers. The tests were carried out in a glass column having an inside diameter of 3.6 centimeters and a height of 186 centimeters. An aerator constructed by sealing a medium fritted glass disc in a 60 milliliter Büchner funnel was attached to the bottom of the column and connected through tubing to a flowmeter. This was in turn connected to an air supply. A solution containing a foaming agent or a combination of foaming agent and water-soluble polymer was fed into the column at a point a short distance above the fritted glass disc. The level of solution in the supply vessel was controlled continuously to maintain a constant head of 12 inches. At the top of the column, a foam outlet was connected through glass tubing to a measuring vessel. This apparatus measures the performance of the foaming agent or foaming agent-polymer combination under constant head conditions such as might be encountered in an air drilling operation in which water flows continuously into the borehole from an adjacent formation. Apparatus which is similar to that employed in the test is described by H. N. Dunning and G. L. Janzen in an article entitled "A Standard Dynamic Foam Test" which appeared on page 31 of the April 1960 issue of Producer's Monthly.

The tests were carried out by injecting air into the solution in the lower part of the column while feeding the fluid in under a constant head of 12 inches. The air rate employed was 500 cubic centimeters per minute. Injection of the air produced a column of foam which rapidly ascended in the apparatus and was carried over into the measuring vessel. After constant conditions had been established, the rates at which water was recovered with the foaming agent alone and with the same foaming agent and each of four different high molecular weight water-soluble polymers obtained from commercial sources were determined. The foaming agent was employed in a concentration of 0.1 percent by volume; while the polymers were used in a concentration of 0.25 pound per barrel of solution. The results obtained are set forth in the following table.

*Table I*

EFFECT OF POLYMERS ON WATER CARRYOVER UNDER CONSTANT HEAD CONDITIONS

| Run | Polymer | Water recovery rate, cc./min. | Recovery rate improvement, percent |
|---|---|---|---|
| A | None | 30 | |
| B | High molecular weight acrylic polymer. | 33.6 | 12 |
| C | Polyacrylamide | 46.5 | 55 |
| D | Acrylamide copolymer | 46.5 | 55 |
| E | Polysaccharide produced by *Xanthomonas campestris*. | 50.3 | 68 |

The data set forth above show that the inclusion of the water-soluble high molecular weight polymers substantially improved the water recovery rate. The improvement ranged from 12 percent in the case of the acrylic type polymer tested in Run B to 68 percent with the polysaccharide employed in Run E. It is thus apparent that all water-soluble polymers are not equally effective when used in the same concentrations. In many cases, however, the less effective materials can be used in relatively high concentrations to achieve the desired results.

EXAMPLE II

To show the effect of concentration and demonstrate that the polymers alone do not improve the water carryover rate, additional tests were carried out with samples of a heteropolysaccharide produced by bacteria of the genus Xanthomonas as described in U.S. Patent 3,020,206. The test apparatus utilized was similar to that described in Example I but did not include means for maintaining a constant head. The tests were carried out by placing an aqueous solution of 0.1 percent by volume of the polyoxyethylated tridecyl alcohol employed earlier in the lower part of the column and then bubbling air through the solution at a rate of 0.5 liter per minute. The volume of water which was carried over into the measuring vessel by the air was read at intervals of 5, 10, 15 and 20 minutes. Similar runs were then made with solutions containing 0.035 weight percent of the heteropolysaccharide and 0.071 weight percent of the foaming agent, 0.071 weight percent of the heteropolysaccharide and 0.071 weight percent of the foaming agent, and 0.071 weight percent of the heteropolysaccharide without the foaming agent. The results of these tests are set forth in the following table.

Table II
EFFECT OF POLYMER IN DYNAMIC FOAM TESTS

| Run | Foaming agent [1] concentration, percent by vol. | Polymer [2] concentration, percent by wt. | Water carryover, ml. | | | |
|---|---|---|---|---|---|---|
| | | | 5 min. | 10 min. | 15 min. | 20 min. |
| A | 0.1 | 0 | 28 | 66 | 106 | 148 |
| B | 0.1 | 0.035 | 38 | 88 | 133 | 165 |
| C | 0.1 | 0.071 | 90 | 133 | 208 | 233 |
| D | 0 | 0.071 | 0 | 0 | 0 | 0 |

[1] Polyoxyethylated tridecyl alcohol.
[2] Heteropolysaccharide produced by fermenting sugar with *Xanthomonas campestris*, separating the polymer from the fermentate, and drying the resultant product.

It can be seen from the above data that the foaming agent alone was only moderately effective for the removal of water from a column. A total of 148 milliliters was carried over during the 20 minute test. The use of the polymer in conjunction with the foaming agent increased the carryover substantially. This increase amounted to about 60 percent where the polymer was employed in a concentration of 0.071 percent by weight. The polymer alone, used in the same concentration, produced little foam and did not result in the carryover of any water under the test conditions employed. The results of this test correlate closely with the performance of foaming agents in oil field drilling operations. It is again apparent from these results that the use of water-soluble high molecular weight polymers in conjunction with foaming agents significantly improves foaming agent performance and thus facilitates the removal of water from wells and similar boreholes.

EXAMPLE III

Further tests similar to those described above were carried out to compare the performance of water-soluble polymers produced by the action of bacteria of the genus Xanthomonas on carbohydrates and that of carboxymethyl cellulose, a high molecular weight water-soluble polysaccharide having a structure quite different from that of the heteropolysaccharide. The same polyoxyethylated tridecyl alcohol employed in the earlier tests was used as the foaming agent. The results of these further tests are shown in Table III below.

Table III
TESTS OF HETEROPOLYSACCHARIDE AND CMC WITH POLYOXYETHYLATED TRIDECYL ALCOHOL

| Run | Polymer | Water carryover, ml. | | | |
|---|---|---|---|---|---|
| | | 5 min. | 10 min. | 15 min. | 20 min. |
| A | None | 30 | 75 | 115 | 160 |
| B | Heteropolysaccharide [1] | 60 | 180 | 265 | 327 |
| C | CMC [2] | 40 | 140 | 235 | 300 |

[1] Heteropolysaccharide produced by fermentation of sugar solution by *Xanthomonas campestris*, polymer used in concentration of 0.25 lb./bbl. of solution containing 0.1 percent foaming agent by volume.
[2] Sodium carboxymethyl cellulose marketed for use in oilfield drilling muds, polymer used in concentration of 0.25 lb./bbl. of solution containing 0.1 percent foaming agent by volume.

The data in Table III show that the heteropolysaccharide and carboxymethyl cellulose were both effective and substantially increased the amount of water carried out of the column by the air stream. The heteropolysaccharide produced by bacteria of the genus Xanthomonas was particularly effective.

EXAMPLE IV

Further tests were carried out to demonstrate the effect of derivatives of the heteropolysaccharides produced by bacteria of the genus Xanthomonas on the performance of foaming agents. The same polyoxyethylated tridecyl alcohol referred to above was utilized as the foaming agent. The heteropolysaccharide employed was a derivative of that used in the preceding examples and was prepared by reacting the native polymer with 20 percent by weight of chromic chloride in aqueous solution. The foaming agent, the chromium derivative of the heteropolysaccharide, and a combination of the two materials were tested in tap water with an air rate of 0.5 liter per minute. The results are set forth in Table IV below.

Table IV
EFFECT OF HETEROPOLYSACCHARIDE DERIVATIVES IN DYNAMIC FOAM TESTS

| Run | Foaming agent [1] concentration percent by vol. | Polymer [2] concentration percent by wt. | Water carryover, ml. | | | |
|---|---|---|---|---|---|---|
| | | | 5 min. | 10 min. | 15 min. | 20 min. |
| A [3] | 0.1 | 0 | 28 | 66 | 106 | 148 |
| B | 0 | 0.086 | 0 | 0 | 0 | 0 |
| C | 0.1 | 0.086 | 30 | 110 | 185 | 255 |

[1] Polyoxyethylated tridecyl alcohol.
[2] Heteropolysaccharide derivative produced by fermenting sugar with *Xanthomonas campestris*, separating the polymer from the fermentate, and adding 20 wt. percent, based on the polymer, of $CrCl_3 \cdot 6H_2O$ to cross-link the polymer molecules in aqueous solution.
[3] Same as Run A in Table II.

Table V
TESTS OF POLYMER WITH COMMERCIAL FOAMING AGENTS

| Run | Foaming agent [1] | Polymer [2] concentration percent by wt. | Water carryover, ml. | | | |
|---|---|---|---|---|---|---|
| | | | 5 min. | 10 min. | 15 min. | 20 min. |
| A | Commercial agent A | 0 | 5 | 10 | 25 | 35 |
| B | do | 0.071 | 60 | 185 | 255 | 300 |
| C | Commercial agent B | 0 | 30 | 75 | 115 | 160 |
| D | do | 0.071 | 60 | 180 | 265 | 327 |
| E | Commercial agent C | 0 | 20 | 30 | 50 | 70 |
| F | do | 0.071 | 30 | 70 | 110 | |
| G | Commercial agent D | 0 | 5 | 15 | 20 | 45 |
| H | do | 0.071 | 80 | 185 | 255 | 315 |
| I | Commercial agent E | 0 | 15 | 25 | 35 | 50 |
| J | do | 0.071 | 40 | 140 | 255 | 315 |
| K | None | 0.071 | 0 | 0 | 0 | 0 |

[1] All foaming agents were used in a concentration of 0.1 percent by volume.
[2] Heteropolysaccharide produced by fermentation of sugar by *Xanthomonas campestris*.

Again it will be noted that the combined materials are considerably more effective than either material used alone. The chromium derivative of the polysaccharide, when used in conjunction with the foaming agent, results in a slightly greater carryover after 20 minutes than is obtained with the purified polysaccharide. The initial carryover values may be somewhat lower than those obtained with the purified polymer. Results similar to these are obtained with the aldehyde derivative of the heteropolysaccharide described in U.S. Patent 3,020,207 and with other derivatives dispersible in aqueous media to form viscous colloidal solutions.

EXAMPLE VI

Still further tests were carried out with the commercial foaming agents and the heteropolysaccharide used above to determine the effectiveness of the polymers in brine solutions. The brine employed contained 250,000 parts per million of sodium chloride. The foaming agents were used in concentrations of 0.2 percent by volume. Heteropolysaccharide concentrations of 0.07 percent by weight were again used. The air rate was maintained at 0.5 liter per minute in all the tests. Table VI shows the results of these tests.

Table VI
EFFECT OF POLYMERS IN BRINE SOLUTION

| Run | Foaming agent [1] | Polymer [2] concentration percent by wt. | Water carryover, ml. | | | |
|---|---|---|---|---|---|---|
| | | | 5 min. | 10 min. | 15 min. | 20 min. |
| A | Commercial agent A | 0 | 0 | 10 | 15 | 23 |
| B | do | 0.071 | 35 | 80 | 140 | 195 |
| C | Commercial agent B | 0 | 32 | 72.5 | 110 | 150 |
| D | do | 0.071 | 77 | 160 | 222 | 275 |
| E | Commercial agent C | 0 | 30 | 60 | 90 | 130 |
| F | do | 0.071 | 80 | 190 | 250 | 275 |
| G | Commercial agent D | 0 | 0 | 50 | 95 | 145 |
| H | do | 0.071 | 87 | 175 | 210 | 240 |
| I | Commercial agent E | 0 | 10 | 30 | 65 | 110 |
| J | do | 0.071 | 57 | 187 | 265 | 292 |
| K | None | 0.071 | 0 | 0 | 0 | 0 |

[1] The foaming agents were used in a concentration of 0.1 percent by volume in all cases.
[2] A heteropolysaccharide produced by the action of *Xanthomonas campestris* on a sugar solution.

EXAMPLE V

In order to test the effect of water soluble polymers with commercial foaming agents marketed for use in air drilling operations and in similar applications, additional tests were carried out with samples of a heteropolysaccharide produced by fermenting sugar with *Xanthomonas campestris* organisms. Five commercial foaming agents found reasonably effective in field operations were tested. Each of these materials was used alone in a concentration of 0.1 percent by volume and at the same concentration in combination with 0.71 percent by weight of the polysaccharide. Tap water was used in all cases. The results, indicated as water carryover obtained in apparatus of the type described earlier, are set forth below.

The data in Table V shows that all of the foaming agents gave significantly better results when employed in conjunction with the polymer than when used alone. The use of the polymer with the foaming agents increases the rate at which the water can be removed from a well or similar borehole and for a given rate may decrease the amount of foaming agent required.

Again the data show that the foaming agents perform more effectively when used with the polymer than when employed alone. The water carryover values at the end of 20 minutes were somewhat lower than those obtained with fresh water in the earlier tests but were sufficient to permit satisfactory water removal during air drilling and similar operations. The data thus show that water soluble polymers can be used to improve water removal in both fresh water and salt water systems.

EXAMPLE VII

Other tests were carried out in apparatus of the type described earlier to determine the effect of the water-soluble polymers on the persistence of the foam column. Fresh water solutions containing (1) ½ lb. per barrel of a commercial nonionic foaming agent, (2) ½ lb. per barrel of the foaming agent and 0.25 lb. per barrel of a heteropolysaccharide produced by *Xanthomonas campestris* organisms, and (3) ½ lb. per barrel of the foaming agent and 0.3 lb. per barrel of a chromium derivative of the heteropolysaccharide were tested. These three solutions were employed individually by injecting air into each solution and measuring the height of the foam column formed and the rate at which it dissipated. It was found that the solution containing only the foaming agent resulted in the formation of a column of foam 820 millimeters high. Water broke out of this column rapidly, 130 milliliters separating in a 2 minute period. After 20 minutes, the height of the column began to diminish and the foam had completely disappeared after 45 minutes. The solution containing both the foaming agent and the heteropolysaccharide, on the other hand, resulted in the formation of a column of foam having considerably more persistence. Only 30 milliliters of water separated from a foam column 820 millimeters high over a six minute period. At the end of 25 minutes, 155 milliliters of water had separated. The foam height was still 750 millimeters. The foam produced from the solution containing the foaming agent and the chromium derivative of the heteropolysaccharide showed even greater persistence. Here the foam height after 25 minutes was 800 millimeters. Water separation was very slow. It is thus apparent that the use of a heteropolysaccharide or a similar water soluble polymer results in the formation of foam which will hold water longer and is thus better able to carry water from the bottom of the borehole to the surface.

EXAMPLE VIII

Additional tests were carried out with different types of foaming agents. Four different foaming agents, two nonionic, one anionic, and one slight cationic, were tested with and without the addition of a heteropolysaccharide produced by *Xanthomonas campestris*. The apparatus employed was similar to that used in Example I in that it included a supply vessel from which the solution containing the foaming agent or a combination of the foaming agent and heteropolysaccharide was fed into the column at a point a short distance above the fritted glass disc. The level of the solution in the supply vessel was controlled continuously to maintain a constant head of 10 inches. The total quantity of water carried over during the sixty minute period with an air rate of 0.5 liter per minute was measured in each test. The results are set forth in Table VII.

be used. The structures of the particular agents employed do not appear critical.

The data set forth above demonstrate that water-soluble polymers are useful in conjunction with foaming agents for the removal of water from oil wells, gas wells and similar boreholes penetrating subterranean formations. The polymers increase the persistence of the foam, improve water retention characteristics of the foam, facilitate the lifting and carrying of cuttings and other solids from the borehole, reduce the concentration in which the foaming agents must be used to remove water under prescribed conditions, and aid in stabilizing the borehole wall. The improved performance thus obtained makes the polymers useful in air drilling operations, in the dewatering of producing gas wells, and in similar situations where gas is passed through a solution containing foaming agents in order to generate foam and force it to the earth's surface.

What is claimed is:

1. A process for removing water from a borehole in the earth to the earth's surface which comprises adding a foam-producing quantity of a foaming agent and a water-soluble polymer having a molecular weight in excess of about 100,000 Staudinger to said water in said borehole and passing a gas through said water to the earth's surface to generate foam and lift said foam in said borehole.

2. A process as defined in claim 1 wherein said water-soluble polymer is a heteropolysaccharide produced by the action of bacteria of the genus Xanthomonas on a carbohydrate.

3. A process as defined by claim 1 wherein said foaming agent is added to said water in a concentration of from about 0.01 to about 2 percent by weight and said water-soluble polymer is added to said water in a concentration of from about 0.001 to about 1 percent by weight.

4. A process as defined by claim 1 wherein said water soluble polymer is sodium carboxymethyl cellulose.

5. A process for removing water from a borehole in the earth which comprises entraining an aqueous solution containing a foaming agent and a water-soluble polymer having a molecular weight in excess of about 100,000

*Table VII*

WATER CARRYOVER UNDER CONSTANT HEAD

| Test | Foaming agent [1] | Polymer [2] concentration, wt. percent | Total water carryover, ml. in 60 min. | Carryover rate, ml./min. | Rate Improvement, percent |
|---|---|---|---|---|---|
| A | Polyoxyethylated tridecyl alcohol | 0 | 531 | 8.85 | |
| B | ___do___ | 0.071 | 830 | 13.85 | 56 |
| C | Cocoamine condensed with 15 mols of ethylene oxide | 0 | 500 | 8.33 | |
| D | ___do___ | 0.071 | 1480 | 24.65 | 196 |
| E | Polyoxyethylated octyl phenol | 0 | 612 | 10.20 | |
| F | ___do___ | 0.071 | 1455 | 24.22 | 138 |
| G | Sodium lauryl sulfate | 0 | 70 | 1.17 | |
| H | ___do___ | 0.071 | 400 | 6.67 | 470 |

[1] All foaming agents used in concentration of 0.1 percent by volume, based on active ingredients.
[2] Heteropolysaccharide produced by fermentation of sugar by *Xanthomonas campestris*, separation of polymer, and drying of product.

The data in Table VII show that the addition of the water soluble polymer increased the water carryover rate significantly. The amount of increase varied somewhat with the different agents but in each case the improvement obtained was sufficient to permit the handling of substantially greater quantities of water than could have been handled otherwise. The data also showed that the heteropolysaccharides and similar polymers may be used with anionic, cationic or nonionic foaming agents. Strongly cationic agents will sometime react with the polymers, particularly in fresh water, and are therefore not generally as suitable for purposes of the invention as the anionic and nonionic materials. They may nevertheless Staudinger in a gas stream, injecting said gas stream into said water in said borehole, and withdrawing foam from said borehole at the earth's surface.

6. A process for removing water from a borehole in the earth which comprises adding from about 0.01 to about 2.0 weight percent of a foaming agent and from about 0.001 to about 1.0 weight percent of carboxymethyl cellulose to said water and passing a gas through said water to generate foam and lift said foam in said borehole.

7. A process for removing water from a borehole in the earth which comprises adding from about 0.01 to about 2.0 percent by weight of a foaming agent and from about 0.001 to about 1.0 percent by weight of a heteropolysaccharide produced by the action of bacteria of the genus Xanthomonas on a carbohydrate to said water and passing a gas through said water to generate foam and lift said foam in said borehole.

8. In a gas drilling process wherein a gas is circulated beneath the bit in a borehole in order to remove cuttings and wherein the entry of water from the surrounding subsurface formation interferes with the circulation of said gas, the improvement which comprises adding a foam-producing amount of a foaming agent and a water-soluble polymer having a molecular weight in excess of about 100,000 to said gas stream, circulating said gas stream containing said foaming agent and said polymer beneath said bit, and withdrawing said water to the surface with said gas stream as a foam.

9. A process for removing accumulated water from a borehole surrounded by a gas producing zone which comprises adding a foam producing quantity of a foaming agent and a water-soluble polymer having a molecular weight in excess of about 100,000 to the water in said borehole and thereafter causing gas to flow from said formation into said water to create an aqueous foam and raise the accumulated water to the surface with the gas.

10. A drilling process which comprises actuating a drill bit at the lower end of a borehole in the earth; injecting a gas and an aqueous solution containing a foam producing quantity of a foaming agent and a water-soluble acrylamide polymer having a molecular weight in excess of about 100,000 into said borehole; and returning said gas with foam and entrained solids to the earth's surface.

11. A process for removing water from a borehole in the earth which comprises adding from about 0.01 to about 2.0 weight percent of a foaming agent and from about 0.001 to about 1.0 weight percent of a chromium derivative of a heteropolysaccharide produced by the action of bacteria of the genus Xanthomonas on a carbohydrate to said water and passing a gas through said water to generate foam and lift said foam in said borehole.

12. In a gas drilling process wherein a gas is circulated beneath the bit in a borehole in order to remove cuttings and wherein the entry of water from the surrounding subsurface formation interferes with the circulation of said gas, the improvement which comprises adding a foam producing amount of a foaming agent and a high molecular weight water-soluble acrylic polymer to said gas stream, circulating said gas stream containing said foaming agent and said polymer beneath said bit, and withdrawing said water to the surface with said gas stream as a foam.

13. A process for removing accumulated water from a producing gas well which comprises dropping a water-dispersible solid containing a foaming agent and a water-soluble polymer having a molecular weight in excess of about 100,000 into said water within said gas well and thereafter causing gas to flow from the surrounding formation into said water to create an aqueous foam and raise the accumulated water to the surface with the gas.

14. A process as defined by claim 13 wherein said polymer is a heteropolysaccharide produced by the action of bacteria of the genus Xanthomonas on a carbohydrate.

15. A process as defined by claim 13 wherein said water-soluble polymer is a carboxymethyl cellulose.

16. A method as defined by claim 13 wherein said water soluble polymer is a polyacrylamide.

References Cited by the Examiner

UNITED STATES PATENTS

| | | | |
|---|---|---|---|
| 2,588,379 | 3/1952 | Frieden et al. | 252—307 X |
| 2,875,555 | 3/1959 | Thiegs et al. | 252—307 X |
| 3,000,790 | 9/1961 | Jeanes et al. | 195—31 |
| 3,020,207 | 2/1962 | Patton | 195—31 |
| 3,054,689 | 9/1962 | Jeanes et al. | 195—31 X |
| 3,073,387 | 1/1963 | Dunning et al. | 166—45 |
| 3,111,998 | 11/1963 | Crowley | 175—68 |
| 3,155,178 | 1/1964 | Kirkpatrick et al. | 171—71 X |
| 3,163,212 | 12/1964 | Bernard | 175—71 X |

OTHER REFERENCES

Dunning et al.: "Foaming Agents: Cure for Waterlogged Gas Wells," The Petroleum Engineer, November 1959, Vol. 31, No. 12, pp. B-28-33.

CHARLES E. O'CONNELL, *Primary Examiner.*

S. J. NOVOSAD, *Assistant Examiner.*